United States Patent
Fredrickson

(12) 
(10) Patent No.: US 6,897,247 B2
(45) Date of Patent: May 24, 2005

(54) HIGH INTERNAL PHASE POLYMERIC EMULSION COMPOSITION

(75) Inventor: Glenn Fredrickson, Santa Barbara, CA (US)

(73) Assignee: PolyE Inc., Amsterdam, NY (US)

( * ) Notice: Subject to any disclaimer, the term of this patent is extended or adjusted under 35 U.S.C. 154(b) by 165 days.

(21) Appl. No.: 10/219,908

(22) Filed: Aug. 14, 2002

(65) Prior Publication Data

US 2003/0055155 A1 Mar. 20, 2003

Related U.S. Application Data

(60) Provisional application No. 60/312,112, filed on Aug. 14, 2001, and provisional application No. 60/344,284, filed on Dec. 28, 2001.

(51) Int. Cl.$^7$ .................................. C08J 9/28
(52) U.S. Cl. ............................. 521/64; 521/62; 521/63; 521/147; 521/150; 521/155; 521/157
(58) Field of Search .............................. 521/64, 62, 63, 521/147, 150, 155, 157

(56) References Cited

U.S. PATENT DOCUMENTS

| | | |
|---|---|---|
| 5,760,097 A | 6/1998 | Li et al. |
| 5,817,704 A | 10/1998 | Shiveley et al. |
| 6,048,908 A | 4/2000 | Kitagawa |

*Primary Examiner*—Ling-Siu Choi
(74) *Attorney, Agent, or Firm*—Patrea L. Pabst, Esq.

(57) ABSTRACT

A high internal phase emulsion composition comprising: a) at least three components; b) component A is a polymer, monomer or mixture thereof; c) component B is a polymer; d) component C is a compatiblizer; e) substantially no voids; and wherein the volume fraction of component A represents at least about 80% by volume of the total volume of components A, B and C; and wherein the volume fraction of component B represents less than about 20% by volume of the total volume of components A, B and C; and wherein at least two phases are formed, a phase containing a majority of component A is discrete and a phase containing a majority of component B is continuous.

22 Claims, No Drawings

HIGH INTERNAL PHASE POLYMERIC EMULSION COMPOSITION

RELATED APPLICATION

This application claims the benefit under 35 U.S.C. 119(e) of U.S. Provisional Application Serial No. 60/312,112, filed Aug. 14, 2001 and No. 60/344,284, filed Dec. 28, 2001.

DETAILED DESCRIPTION OF THE INVENTION

The present invention relates to a "high internal phase polymeric emulsion" ("HIPPE") composition. The HIPPE composition of the present invention comprises an emulsion: (a) of two or more phases wherein the volume fraction of the discrete phase is the majority fraction (on a volume basis) of the total volume of the emulsion; and (b) that has substantially no voids. For purposes of the present invention, the term "component A" will be used to designate the discrete phase; the term "component B" will be used to designate the continuous phase; and the term "component C" will be used to designate the compatibilizer. It is understood that these are merely terms for explanation purposes and are not meant to limit the invention to only these three specific components.

For further purposes of the present invention, the term:
(a) "phase" means a portion of a physical system that is uniform throughout, has defined boundaries and, in principle, can be separated physically from other phases.
(b) "high internal phase polymeric emulsion" ("HIPPE") means an emulsion of two or more phases wherein the volume fraction of the discrete phase is the majority fraction (on a volume basis) of the total volume of the emulsion and, in one embodiment, the discrete phase represents more than about 80% by volume of the total volume of the emulsion.
(c) "emulsion" means a stable mixture of two or more immiscible liquids held in suspension by an emulsifier. An "emulsion" includes both a continuous phase as well as a discrete (i.e. discontinuous) phase that is dispersed throughout the continuous phase.
(d) "polymer" means a macromolecule composed of at least three of the same type of monomeric moieties. Typically, a polymer is formed by the chemical union of monomeric units.
(e) "compatibilizer" means a molecular species that, when mixed with two immiscible fluids A and B, is preferentially located at the interface between the two phases and serves to reduce the interfacial tension between the phases. Compatibilizers include surfactants, block copolymers, random copolymers, and graft copolymers.
(f) "discrete phase" means a phase of a material that is separated into disconnected pieces, such that it is not possible to find a connected path of material points lying entirely within that phase and that spans macroscopically ("percolates") across the material sample.
(i) "continuous phase" means a phase of a material that contains at least one connected path of material points lying entirely within that phase and that spans macroscopically ("percolates") across the material sample.
(j) "graft" copolymer means a macromolecule that has a central backbone composed of one or more repeated monomeric units to which is chemically affixed one or more "graft" macromolecules, each of which is chemically distinct from the backbone and is itself composed of one or more repeated monomeric units.
(k) "block" copolymer means a macromolecule with two or more sections, each chemically distinct from the other sections and each composed of one or more repeated monomeric units.
(l) "random" copolymer means a macromolecule that is composed of a stochastic sequence of two or more distinct monomeric units.
(m) "substantially no voids" means that the composition has a void volume fraction less than about 0.25. In one embodiment, the void volume fraction may be correlated to the density of the composition. For example, in an embodiment of the present invention, the density of the HIPPE is greater than about 100 mg/cc.
(n) "mixing" is equivalent to blending and/or agitating and means that the materials are sufficiently dispersed to form an emulsion. Suitable devices include, but are not limited to, impellers, propellers, paddles, turbines, motionless mixers, extruders, and recycle loops.
(o) "selective solvent for a component" means a solvent in which that component has greater solubility than all other components of the composition.

In an embodiment of the present invention, a high internal phase polymeric emulsion composition comprises: (a) at least three components: (i) component A is a polymer, monomer or a mixture thereof, (ii) component B is a polymer; and (iii) component C is a compatibilizer; (b) a volume fraction of component A of at least about 80% by volume of the total volume of components A, B and C; (c) at least two phases wherein: (i) the phase containing a majority of component A is discrete; and (ii) the phase containing a majority of component B is continuous; and (d) substantially no voids.

a. Component A

In the present invention, "component A" denotes the discrete phase of the HIPPE composition and may be a polymer, monomer or a mixture thereof. In one embodiment when component A is a monomer, the monomer component present in the HIPPE composition comprises one or more monomers. Suitable monomers include styrene, vinyl toluene, alphamethyl styrene, divinyl benzene, isoprene, butadiene, methyl methacrylate, acrylonitrile, vinyl chloride, vinyl acetate, maleic anhydride, and thermoset monomers (e.g. bisphenol A, propylene oxide). The volume fraction of component A is the majority fraction (on a volume basis) of the total volume of the emulsion and, in one embodiment, component A represents at least about 80% by volume of the total volume of the emulsion. In yet another embodiment, component A represents at least about 90% by volume of the total volume of the emulsion.

In a further embodiment, the monomer component may also optionally comprise one or more crosslinking agents, catalysts and polymerization advancers. Suitable crosslinking agents include sulfur, selenium, sulfur monochloride, formaldehyde, di-isocyanates, polyamines, and peroxides. The crosslinking agent will generally comprise less than 5% by weight of the composition. Some of these crosslinking agents may be incorporated as a non-crosslinked monomer.

In yet another embodiment when component A is a polymer, the polymer component present in the HIPPE composition comprises one or more polymers. Suitable polymers include: polyethylenes, including HDPE, LDPE, LLDPE, VLDPE, and ULDPE; polypropylenes; copolymers of ethylene and propylene, including EPR, EPDM, EVA, EAA and EVOH; copolymers of ethylene with higher alpha-olefins, including ethylene-butene, ethylene-hexene, and ethylene-octene copolymers; polystyrenes; ethylene styrene; copolymers of styrene, including SBR, SBS, SIS, SEBS, SAN, SMA, and ABS; polybutadienes; polyisoprenes; polyvinyl chlorides; vinyl chloride copolymers; polyamides; polyimides; polycarbonates; polyesters, including PET, PBT; PETG, and polyarylates; acrylic polymers including PMMA, PMMA copolymers; polyethers, including polyetherimides, polyetherketones, polyethersulfones, polyethylene glycol, and polypropylene glycol; polyphenylene oxides and sulfones; polyvinylidine chlorides and fluorides; natural rubbers and chemically modified natural rubbers; partially polymerized thermosets (e.g. B-stage thermosets) silicone rubbers; thermoplastic polyolefin rubbers; and polyurethanes, including TPUs. While any molecular weight polymer may be used in the present invention, in one embodiment, a molecular weight in the range of 1,000–5,000,000 Daltons may be used.

b. Component B:

In the present invention, "component B" denotes the continuous phase of the HIPPE composition and is a polymer. In one embodiment, component B comprises one or more polymers. Suitable polymers include: polyethylenes, including HDPE, LDPE, LLDPE, VLDPE, and ULDPE; polypropylenes; copolymers of ethylene and propylene, including EPR, EPDM, EVA, EAA and EVOH; copolymers of ethylene with higher alpha-olefins, including ethylenebutene, ethylene-hexene, and ethylene-octene copolymers; polystyrenes; ethylene styrene; copolymers of styrene, including SBR, SBS, SIS, SEBS, SAN, SMA, and ABS; polybutadienes; polyisoprenes; polyvinyl chlorides; vinyl chloride copolymers; polyamides; polyimides; polycarbonates; polyesters, including PET, PBT; PETG, and polyarylates; acrylic polymers including PMMA, PMMA copolymers; polyethers, including polyetherimides, polyetherketones, polyethersulfones, polyethylene glycol, and polypropylene glycol; polyphenylene oxides and sulfones; polyvinylidine chlorides and fluorides; natural rubbers and chemically modified natural rubbers; partially polymerized thermosets; silicone rubbers; thermoplastic polyolefin rubbers; polyurethanes, including TPUs; and conjugated polymers including polythiophenes, polypyrroles, and polyanilines.

The polymer may be included in the continuous phase in an amount in the range of about 0.1 wt. % to about 100 wt. % based the volume of the continuous phase. While any molecular weight polymer may be used in the present invention, in one embodiment, a molecular weight in the range of 1,000 to 5,000,000 Daltons may be used.

In another embodiment, the polymer of component B may be produced by polymerizing one or more monomers during the formation of the HIPPE composition. Suitable monomers that may be used to produce component B include: vinyl monomers, such as vinyl acetate, styrene, vinyl toluene, alpha-methyl styrene, vinyl chloride; multifunctional monomers such as di-vinyl benzene; dienes such as isoprene and butadiene; acrylic monomers such as methyl methacrylate; esters; epoxies; ethers; urethanes; silicones; monomers leading to intrinsically conducting polymers, including thiophenes, pyrroles, and anilines and monomers that polymerize with styrene (e.g. acrylic nitrate, maleic anhydride). The monomers may also optionally be comprised of one or more crosslinking agents. Suitable crosslinking agents include sulfur, selenium, sulfur monochloride, formaldehyde, di-isocyanates, polyamines, polyalcohols, and peroxides. For example, component B may be produced by using about 0.0001% to about 5% by weight of crosslinking agent, and about 99.9999% to about 95% by weight of monomer(s).

The continuous phase of the HIPPE composition of the present invention may also contain a polymerization initiator, such as a free radical initiator component. However, polymerization and cross-linking of the monomer (s) in the continuous phase may be accomplished without a polymerization initiator, for example, via exposing the emulsion to ultraviolet radiation or other polymerization techniques known to those skilled in the art. Suitable free radical initiators include acyl peroxides, alkyl peroxides, hydroperoxides, peresters, AIBN, disulfides, and tetrazenes.

In a further embodiment, components A and/or B may be any thermoplastic material. Examples of suitable thermoplastics include polyethylenes, including HDPE, LDPE, LLDPE, VLDPE, and ULDPE; polypropylenes; copolymers of ethylene and propylene, including EPR, EPDM, EVA, EAA and EVOH; copolymers of ethylene with higher alpha-olefins, including ethylene-butene, ethylene-hexene, and ethylene-octene copolymers; polystyrenes; ethylene styrene; copolymers of styrene, including SBR, SBS, SIS, SEBS, SAN, SMA, and ABS; polybutadienes; polyisoprenes; polyvinyl chlorides; vinyl chloride copolymers; polyamides; polycarbonates; polyesters, including PET, PBT; PETG, and polyarylates; acrylic polymers including PMMA, PMMA copolymers; polyethers, including polyetherimides, polyetherketones, polyethersulfones, polyethylene and polypropylene oxides; polyphenylene oxides and sulfones; polyvinylidine chlorides and fluorides; natural rubbers and chemically modified natural rubbers; partially polymerized thermosets; thermoplastic polyolefin and silicone rubbers; polyurethanes, including TPUs; and certain conjugated polymers including polythiophenes, polypyrroles, and polyanilines. In yet a further embodiment, components A and/or B may be a thermoset. Examples of suitable thermosets include phenolic resins, urea-formaldehyde resins, melamine-formaldehyde resins, polyester resins, vinyl ester resins, styrene esters, epoxide resins, polyurethanes, polyisocyanurates, furan resins, and silicone resins.

In yet another embodiment, polymer A and/or B may be any percentage of plastic, rubber and/or crosslinked resin.

In a further embodiment, component A and component B are thermoplastic olefins and C is an olefinic copolymer. For example, component A could be a low density polyethylene, B could be a polypropylene, and C could be an EPR copolymer.

In one embodiment, polymer A may be selected, for example, based on price—a lower cost material than component B because polymer A is the major phase. Examples of lower cost thermoplastic polymers may include, but are not limited to: polyolefins, including polyethylenes, polypropylenes, and copolymers with higher alpha-olefins; polyamides, including nylon 6—6; polyesters, including PET; PBT; PVCs; polystyrene and copolymers of polystyrene (e.g. SMA, SAN, ABS); rubbers (e.g. olefin rubbers, polybutadienes, polyisoprenes, SBS, natural rubbers); acrylics such as PMMA. Examples of lower cost thermosets include, but not limited to: phenolics, epoxies, polyurethanes, vinyl ester resins, styrene esters.

In yet another embodiment, component A may be a particle composed of the polymeric material discussed above. For example, component A may be a particle composed of polystyrene.

In another embodiment, polymer B is selected, for example: (a) based on price—a higher cost material than component A (e.g. since only minor amounts need be used, but the HIPPE composition will have some of the superior properties of the more expensive component B because it is located in the continuous phase); (b) biodegradable; (c) electrical, ionic and/or thermal conductivity; (d) barrier properties; and/or (e) environmental and chemical resistance. Based on one of these criteria, examples of component B include, but are not limited to: EVOH; fluorinated polymers, (e.g. TFE, PVDF); epoxies; polyamides, polycarbonates; polyesters, including PETG, and polyarylates; polyethers, including polyetherimides, polyetherketones, polyethersulfones, polyethylene and polypropylene oxides; polyphenylene oxides and sulfones; polyvinylidine chlorides; silicones; polyurethanes; polylactic acid; polyhyroxy alkonates and conjugated polymers including polythiophenes, polypyrroles, and polyanilines.

c. Compatibilizer

In the present invention, "component C" denotes the compatibilizer of the HIPPE composition. The role of the compatibilizer is to lower the interfacial tension between the phases containing components A and B and to otherwise modify the interfacial properties so as to stabilize the HIPPE morphology. The compatibilizer is selected so that one part has a greater affinity to component B and the other part has a greater affinity to component A. In an embodiment, the compatibilizer is selected so that one part has a greater affinity to component B than the other part's affinity to component A. Such a compatibilizer has a higher solubility in component B (or its precursor) than in component A (or its precursor).

In one embodiment, block copolymer compatibilizers are employed in the present invention to establish the emulsion. Specifically, in one example, AB diblock copolymer compatibilizers are employed where chains of the two immiscible components (i.e. A and B) are bonded together to form a surfactant-like molecule (component C). As such, the presence of the AB diblock copolymer acts an emulsifier. In another embodiment, random copolymer compatibilizers are employed to establish the emulsion. Suitable compatibilizers include: diblock and triblock copolymers such as styrene-butadiene, styrene-butadiene-styrene, styrene-isoprene, styrene-isoprene-styrene, methylmethacrylate-styrene, methylmethacrylate-butadiene, styrene-butadiene-methylmethacrylate, ethylene oxide-propylene oxide, etc; hydrogenated versions of the above such as SEBS, SEPS, etc; styrenic random copolymers such as SBR, SMA, SAN, SMMA, and ABS; and polyolefin random copolymers such as EPR, EVA, EVOH, EVC, etc. In one embodiment, the ratio (on a volume basis) of component B to compatibilizer C is about 1:1. Other ratios (on a volume basis) of component B to compatibilizer C include continuous variations between 10:1 and 1:10.

d. Processing Conditions for Obtaining HIPPE Compositions

In one embodiment, the high internal phase polymeric emulsion composition of the present invention comprises at least three components: a) wherein component A is a polymer; b) wherein component B is a polymer; and c) wherein component C is a compatiblizer; and d) wherein: (i) the volume fraction of component A represents at least about 80% by volume of the total volume of components A, B and C; (ii) the volume fraction of component B represents less than about 20% by volume of the total volume of components A, B and C; (iii) at least two phases are formed, the phase containing a majority of component A is discrete and the phase containing a majority of component B is continuous; and (iv) wherein the overall density of the composition is greater than about 100 mg/cc.

In a more specific embodiment, the components C and A are immiscible within each other. And, in another more specific embodiment, C is more miscible in B than in A. In yet another embodiment, the resulting high internal phase polymeric emulsion composition has a higher barrier, heat resistance, electric resistance, chemical resistance properties, or greater electrical ionic, or thermal conductivity, than the majority phase (i.e. component A).

(1) Formation Of HIPPE

In one embodiment, a high internal phase polymeric emulsion composition may be prepared, for example, by a process comprising the steps of: (a) forming a continuous phase by dissolving a compatibilizer in a monomer, or in a mixture of monomers (precursor to component B); (b) sufficient blending of component A to form a discrete phase and maintain the continuous phase of compatibilizer plus monomer(s); (c) polymerizing the monomer(s) in the phases; and (d) final curing and/or drying to form the resulting HIPPE composition with component A as the discrete phase and component B as the continuous phase.

In another embodiment where the starting components are polymers, a high internal phase polymeric emulsion composition may be prepared, for example, by a process comprising the steps of: (a) adding component B to form a continuous phase; (b) blending in a compatibilizer; and (c) adding component A to component B plus compatibilizer at a sufficiently slow rate and at sufficient mixing conditions to maintain component B in the continuous phase.

One specific example of the ratio of the components is (by volume) 2% of component B, 2% of compatibilizer and 96% of component A. Other ratios include (by volume) X% component B, Y% component C, and (100-X-Y)% component A, where X and Y can be continuously varied between 0.01 and 20.0.

In yet another embodiment, the high internal phase polymeric emulsion of the present invention may be produced by the steps comprising: (a) mixing component B and component C; (b) feeding component A at a sufficiently slow rate into the mixture while sufficiently stirring the mixture in order to maintain phase A in the discrete phase; and (c) sufficient cooling the composition to "lock in" the high internal phase polymeric emulsion morphology by initiating a vitrification or crystallization process.

A further example of a process for creating a high internal phase polymeric emulsion of the present invention having monomer A and a starting monomer for component B comprises the steps of: (a) mixing a starting monomer for component B and compatibilizer C to produce a continuous phase; (b) feeding monomer A at a sufficiently slow rate and a sufficient mixing rate in order to maintain monomer A in a discrete phase; (c) thermally initiating polymerization of either or both monomer A and/or the starting monomer for component B; and, if necessary, or in the alternative, (d) UV polymerization of either or both monomer A and/or the starting monomer for component B; and (e) cooling the mixture below the $T_g$ and/or $T_m$ of one or both of the monomers.

In another example of a process for the high internal phase polymeric emulsion of the present invention having monomer A and a starting monomer for component B comprises the steps of: (a) mixing the starting monomer for component B and compatibilizer C; (b) feeding monomer A at a sufficiently slow rate and a sufficient mixing rate in order to maintain monomer A in a discrete phase; (c) thermally initiating polymerization of either or both monomer A and/or the starting monomer for component B; and, if necessary, or in the alternative, (d) UV polymerization either or both monomer A and/or the starting monomer for component B; and (e) crosslinking one or both of the monomers.

In yet a further example, the high internal phase polymeric emulsion of the present invention may be produced by a melt blend process (e.g. in an extruder) wherein component A is a particle and added to components B and compatibilizer C, which is soluble in B.

In a further example of a process for the high internal phase polymeric emulsion of the present invention having monomer A and a starting monomer for component B to form compatibilizer C in situ by: (a) feeding monomer A into the starting monomer for component B; and (b) sufficiently mixing the material of step (a) so as to react monomer A with the starting monomer for component B to form compatibilizer C, while maintaining B as a continuous phase.

Another example of a process for the high internal phase polymeric emulsion of the present invention having monomer A and the starting monomer for component B as the starting components comprises the steps of: (a) premixing compatibilizer C with the starting monomer for component B; (b) feeding monomer A at a sufficiently slow rate and a sufficient mixing rate in order to maintain monomer A in a discrete phase; and (c) polymerizing by UV or thermal.

In yet another example of a process for the high internal phase polymeric emulsion of the present invention having monomer A and component B as a polymer comprises the steps of: (a) mixing the polymer of component B and compatibilizer C; (b) feeding monomer A at a sufficiently slow rate and a sufficient mixing rate in order to maintain monomer A in a discrete phase; (c) thermally initiating polymerization of the monomer A or UV polymerization of monomer A; and (e) crosslinking the resulting component A.

In another variation of the above, component A may be one or more monomers with optional solvents, blowing agents and/or initiators. Suitable solvents include water, supercritical $CO_2$, fluorinated surfactants, toluene, cyclohexane, acetone, and THF. In a further embodiment, the HIPPE composition may be produced in a solventless process. For example, components A and B may be a thermoplastic with component B being heated above its $T_g$ and/or $T_m$ with a block copolymer compatibilizer and with sufficient agitation to maintain the continuous phase.

In yet another example of a process for creating a high internal phase polymeric emulsion, component A can consist of one or more reactive monomers, while component B can be a mixture of a polymer B and a selective solvent for polymer B. The HIPPE composition is produced by the steps of: (a) mixing the polymer and solvent of component B with compatibilizer C; (b) feeding component A into the mixture at a sufficiently slow rate and a sufficient mixing rate in order to maintain component A in a discrete phase; (c) initiating a thermal or UV polymerization of the reactive monomers in component A; and (d) removing the selective solvent within component B by a drop in pressure and/or elevation in temperature. In a further embodiment, steps (c) and (d) are carried out in reverse order, or simultaneously.

A further example of a process for the high internal phase polymeric emulsion of the present invention having component A as a polymer and component B comprises the steps of: (a) mixing components B and compatibilizer C; (b) feeding component A at a sufficiently slow rate and a sufficient mixing rate in order to maintain component A in a discrete phase; and (c) cooling the mixture of step b) to lock the morphology.

In one embodiment, the process starts off with the minor phase (component B) and the major phase (component A) is added at a sufficient rate to maintain the minor phase as the continuous phase.

In another embodiment of a process for the high internal phase polymeric emulsion of the present invention, the steps comprise: 1) forming a stable high internal phase polymeric emulsion composition; and 2) polymerizing/curing this stable emulsion under conditions suitable for forming a solid polymeric structure.

It is understood that, in one embodiment, the HIPPE compositions of the present invention may be prepared by low-cost compounding methods, using conventional polymer processing equipment. Moreover, in yet another embodiment, the HIPPE compositions of the present invention have sufficient stability against time and temperature annealing, as well as subsequent processing.

In a further embodiment, the HIPPE composition of the present invention can be formed by subjecting the combined phases to shear agitation. Shear agitation is generally applied to an extent and for a time period necessary to form a stable emulsion. Such a process can be conducted in either batchwise or continuous fashion and is generally carried out under conditions suitable for forming an emulsion where the continuous and discrete phases are dispersed to such an extent that the resulting polymeric structure will have the requisite mechanical characteristics. Emulsification of the phase combination include, but is not limited to, the use of a mixing or agitation device such as a pin impeller, extruder, or compounder.

(2). Polymerization/Curing of the HIPPE

In one embodiment, the HIPPE composition of the present invention formed may be collected in a suitable reaction vessel. For example, the temperature at which the HIPPE may enter the vessel may be the same as the polymerization/curing temperature. Suitable polymerization/curing conditions will vary depending upon the monomer and/or polymer and other makeup of the phases of the emulsion (especially the compatibilizer systems used), and the type and amounts of polymerization initiators used. Frequently, however, suitable polymerization/curing conditions will involve maintaining the HIPPE composition at temperatures above about 160 degrees Celsius for periods ranging from less than a minute to several hours.

In an embodiment, once the HIPPE composition has been polymerized/cured, the HIPPE composition may be cut or sliced into a sheet-like form, or machined into desirable shapes.

The relative amounts of the polymer/monomer A phase to polymer B phase used to form the HIPPE composition of the present invention may effect the structural, mechanical and/or performance properties of the resulting polymeric composition. For example, the ratio of polymer/monomer A to monomer/polymer B in the emulsion may influence the density, modulus, heat resistance, clarity, barrier properties, toughness, tensile and flexural strength, etc. The emulsions used to prepare the HIPPE composition may have a ratio of polymer/monomer A phase to polymer B phase ranging from about 4:1 to about 98:1 on a volume basis.

e. Characteristics of HIPPE composition:

The HIPPE composition of the present invention consists of substantially no voids. In one embodiment, the HIPPE composition has a void volume less than about 5%. In another embodiment, the void volume may be correlated to the density of the composition. For example, in an embodiment of the present invention, the density of the HIPPE composition is greater than about 100 mg/cc.

Depending on the formulations, the HIPPE compositions of the present invention may exhibit one or more of the following properties:

(a) Low Cost Barrier—a higher cost barrier polymer may be diluted down to as little as 1% into a lower cost, commodity plastic (e.g. polyethylene, polypropylene, polystyrene), and yet still preserve much of its desirable barrier characteristics against species such as oxygen, water, and $CO_2$. For example, HIPPE compositions may replace higher cost, fluorinated polymers that are used in barrier applications.

(b) Unique Mechanical and Rheological Properties—by virtue of the minority phase being continuous and the majority phase discrete, combining HIPPE structures could yield unique mechanical and/or Theological property sets. In one example, the HIPPE composition could be further enhanced by the use of thermoset polymers for either the majority of minority phase. For example, an epoxy or other thermoset may be cured inside the cells of a HIPPE structure (discrete phase), while the cell walls (continuous phase) are thermoplastic. The overall structure may be highly filled and thus have high modulus, yet might still be processible as a thermoplastic. In another example, the minority continuous phase employs a polymer that withstands aggressive chemicals and thus, a low cost, chemically resistant polymer blend is produced. In a further example, a HIPPE composition may be produced for an application such as the automotive industry having the combined properties of two or more of the following: stiffness; toughness; resistance to oil; heat resistance; processibility; and/or price.

(c) Low Cost, High Heat Plastics—HIPPE structures may allow higher cost, high-heat thermoplastics, such as polysulfones, to be used in very small proportions, yet still provide structural integrity at elevated temperatures.

(d) Low Cost, Electrical or Ionic Conductors—the continuity of the minor phase of HIPPE plastic structures may be exploited with higher cost, yet high performance, polymers that are either electrical or ionic conductors. The HIPPE structure allows such polymers to be diluted down to very low levels with lower cost engineering or commodity plastics to lower overall cost.

EXAMPLE 1

This example illustrates the preparation of a HIPPE composition by the claimed HIPPE polymerization process. To two parts component B comprising polyvinylidine fluoride (PVDF) is added two parts of component C comprising a diblock copolymer of polystyrene and poly (methylmethacrylate), while mixing with a high shear mixing blade at 100 rotations per minute (rpm). 96 parts component A, comprising poly-(2,6-dimethyl-p-phenylene oxide) (PPO) is added to the B/C mixture at a rate of 5 grams/min while stirring with a high shear mixing blade at 100 rpm. The addition rate and mixing rates are employed to maintain component B in the continuous phase.

In another example component A is replaced by an alloy of PPO with polystyrene.

In yet another example, an emulsion according to the present invention is produced by forming a first curable high internal phase emulsion by gradually adding and mixing a component A (i.e. monomer/polymer) into a component B containing a mixture of polymerizable monomers and a compatiblizer. A polymerization initiator is added either in the component A or B solution before mixing or after formation of the emulsion depending on the desired process conditions. The curable high internal phase emulsion is then cured (polymerized and crosslinked) by heating the emulsion at a temperature of at least about 100 degrees Celsius for a time sufficient to cure the monomers.

What is claimed:

1. A high internal phase emulsion composition comprising discrete phase comprising
   component A, wherein component A is a polymer, monomer or mixture thereof;
   a continuous phase comprising component B, wherein component B is a polymer; and
   component C, wherein component C is a compatibilizer selected from the group consisting of surfactants, block copolymers, random copolymers and graft copolymers; and
   substantially no voids; wherein the discrete phase represents at least about 80% by volume of the total volume of components A, B, and C; and the volume fraction of the continuous phase represents less than about 20% by volume of the total volume of components A, B, and C.

2. The composition of claim 1, wherein the components C and A are immiscible within each other.

3. The composition of claim 1, wherein component A is polystyrene, component B is poly(2-vinylpyridine) and C is a block copolymer.

4. The composition of claim 1 wherein the ratio of component B: component C is between 10:1 and 1:10.

5. The composition of claim 1 wherein component C is a surfactant.

6. The composition of claim 1 wherein component A is a monomer selected from the group consisting of styrene, vinyl toluene, alphamethyl styrene, divinyl benzene, isoprene, butadiene, methyl methacrylate, acrylonitrile, vinyl chloride, vinyl acetate, maleic anhydride, and thermoset monomers.

7. The composition of claim 1 wherein component A is a polymer selected from the group consisting of polyethylenes, polypropylenes, copolymers of ethylene and propylene, copolymers of ethylene, polystyrenes, ethylene styrene, copolymers of styrene, polybutadienes, polyisoprenes, polyvinyl chlorides, vinyl chloride copolymers, polyamides, polyimides, polycarbonates, polyesters, polyarylates, acrylic polymers and copolymers, polyethers, polyethylene glycol, polypropylene glycol, polyphenylene oxides, polyphenylene sulfones, polyvinylidine chlorides, polyvinylidine fluorides, rubbers, partially polymerized thermosets, silicone rubbers, thermoplastic polyolefin rubbers, and polyurethanes.

8. The composition of claim 1 wherein component A is in the form of particles.

9. The composition of claim 1 wherein component A comprises at least 90% by volume of the composition.

10. The composition of claim 1, wherein component A is poly-(2,6-dimethyl-p-phenylene oxide).

11. The composition of claim 1, wherein component A is a monomer comprising one or more components selected from the group consisting of cross-linking agents, catalysts, or polymerization advancers.

12. The composition of claim 1 wherein component A and component B are thermoplastic polymers.

13. The composition of claim 1 wherein component A, component B or component A and B are thermoset polymers.

14. The composition of claim 1, wherein component A and component B are thermoplastic olefins and component C is an olefinic copolymer.

15. The composition of claim 1 wherein component B is selected from the group consisting of polyethylenes, polypropylenes, copolymers of ethylene and propylene, copolymers of ethylene with higher alpha-olefins, polystyrenes, ethylene styrene, copolymers of styrene, polybutadienes, polyisoprenes, polyvinyl chlorides, vinyl chloride copolymers, polyamides, polyimides, polycarbonates, polyesters, polyarylates, acrylic polymers and copolymers, polyethers, polyethylene glycol, polypropylene glycol, polyphenylene oxides, polyphenylene sulfones, polyvinylidine chlorides, polyvinylidine flourides, rubbers, partially polymerized thermosets, silicone rubbers, thermoplastic polyolefin rubbers, polyurethane, and conjugated polymers.

16. The composition of claim 1 wherein component B is selected from the group consisting of polythiophenes, polypyrroles, and polyanilines.

17. The composition of claim 1, wherein the density of the composition is greater than about 100 mg/cc.

18. The composition of claim 1 wherein components C and A are immiscible within each other.

19. The composition of claim 1 wherein component C is mare miscible in component B than in component A.

20. The composition of claim 1 produced by a process comprising:
   (a) mixing component B and component C;
   (b) feeding component A into the mixture while stirring to maintain component A as a discrete phase; and
   (c) cooling of the composition to initiate vitrification or crystallization.

21. The composition of claim 1 produced by a process comprising:
   (a) forming a continuous phase by dissolving component C in a monomer, or in a mixture of monomers which is polymerizable to form the continuous phase;
   (b) blending component A into the continuous phase to form a discrete phase and maintain the continuous phase comprising component C in combination with the monomer(s);
   (c) polymerizing the monomer(s) in the phases; and
   (d) curing and/or drying to form the resulting composition.

22. The composition of claim 1 produced by a process comprising:
   (a) mixing a starting monomer for component B and compatibilizer C to produce a continuous phase;
   (b) feeding monomer A into the mixture of B and C in order to maintain monomer A in a discrete phase;
   (c) thermally initiating polymerization of either or both monomer A and starting monomer for component B and/or (d) UV polymerizing one or both monomer A and the starting monomer
   (c) thermally initiating plymerization of either of both monomer A and the stating monomer for component B and/or (d) for component B; and (e) cooling the mixture below the Tg and/or Tm of the remaining monomer(s) and/or the resulting polymer(s).

* * * * *